(12) United States Patent
Hagen et al.

(10) Patent No.: US 10,528,732 B2
(45) Date of Patent: Jan. 7, 2020

(54) IDENTIFYING A SIGNATURE FOR A DATA SET

(71) Applicant: Trend Micro Incorporated, Tokyo (JP)

(72) Inventors: Josiah Dede Hagen, Austin, TX (US); Jonathan Edward Andersson, Austin, TX (US)

(73) Assignee: Trend Micro Incorporated, Tokyo (JP)

( * ) Notice: Subject to any disclaimer, the term of this patent is extended or adjusted under 35 U.S.C. 154(b) by 68 days.

(21) Appl. No.: 15/988,935

(22) Filed: May 24, 2018

(65) Prior Publication Data

US 2018/0268140 A1   Sep. 20, 2018

Related U.S. Application Data

(63) Continuation of application No. PCT/US2015/067162, filed on Dec. 21, 2015.

(51) Int. Cl.
*G06F 21/56* (2013.01)
*H03M 7/30* (2006.01)

(52) U.S. Cl.
CPC ............ *G06F 21/564* (2013.01); *H03M 7/30* (2013.01); *G06F 2221/033* (2013.01)

(58) Field of Classification Search
CPC .............................. G06F 21/564; G06F 21/565
See application file for complete search history.

(56) References Cited

U.S. PATENT DOCUMENTS

| 5,473,769 | A | * | 12/1995 | Cozza ................... G06F 21/564 |
| | | | | 711/113 |
| 7,802,303 | B1 | | 9/2010 | Zhao et al. |
| 9,785,773 | B2 | * | 10/2017 | Falk ........................ G06F 21/56 |
| 2004/0157556 | A1 | | 8/2004 | Barnett et al. |
| 2009/0132461 | A1 | | 5/2009 | Garg et al. |
| 2009/0300765 | A1 | | 12/2009 | Moskovitch et al. |
| 2010/0107255 | A1 | | 4/2010 | Eiland et al. |
| 2011/0067106 | A1 | | 3/2011 | Evans et al. |

OTHER PUBLICATIONS

PCT Written Opinion of the International Searching Authority for International Application No. PCT/2015/067162, dated Aug. 24, 2016, 5 pages. (Year: 2016).*

* cited by examiner

*Primary Examiner* — Ponnoreay Pich
(74) *Attorney, Agent, or Firm* — Okamoto & Benedicto LLP

(57) ABSTRACT

Examples relate to identifying a signature for a data set. In one example, a computing device may: receive a data set that includes a plurality of data units; iteratively determine a measure of complexity for windows of data units included in the data set, each window including a distinct portion of the plurality of data units; identify, based on the iterative determinations, a most complex window of data units for the data set; and identify the most complex window as a data unit signature for the data set.

15 Claims, 4 Drawing Sheets

IDENTIFYING A SIGNATURE FOR A DATA SET

CROSS-REFERENCE TO RELATED APPLICATION

This application is a continuation of International Application No. PCT/US2015/067162, with an International Filing Date of Dec. 21, 2015, which is incorporated herein by reference in its entirety.

BACKGROUND

Data signatures are often used when attempting to identify or match sets of data without the need to compare full data sets. For example, computer virus signatures may be calculated by hashing known computer viruses and using the hash results as signatures. Unknown computer files can be hashed and the results may be compared to the computer virus signatures, and matches may indicate that the unknown files are computer viruses. Data signatures may also be used in other contexts, such as the detection of plagiarism and biometric identification using fingerprinting or DNA.

BRIEF DESCRIPTION OF THE DRAWINGS

The following detailed description references the drawings, wherein.

DETAILED DESCRIPTION

Figure 1:
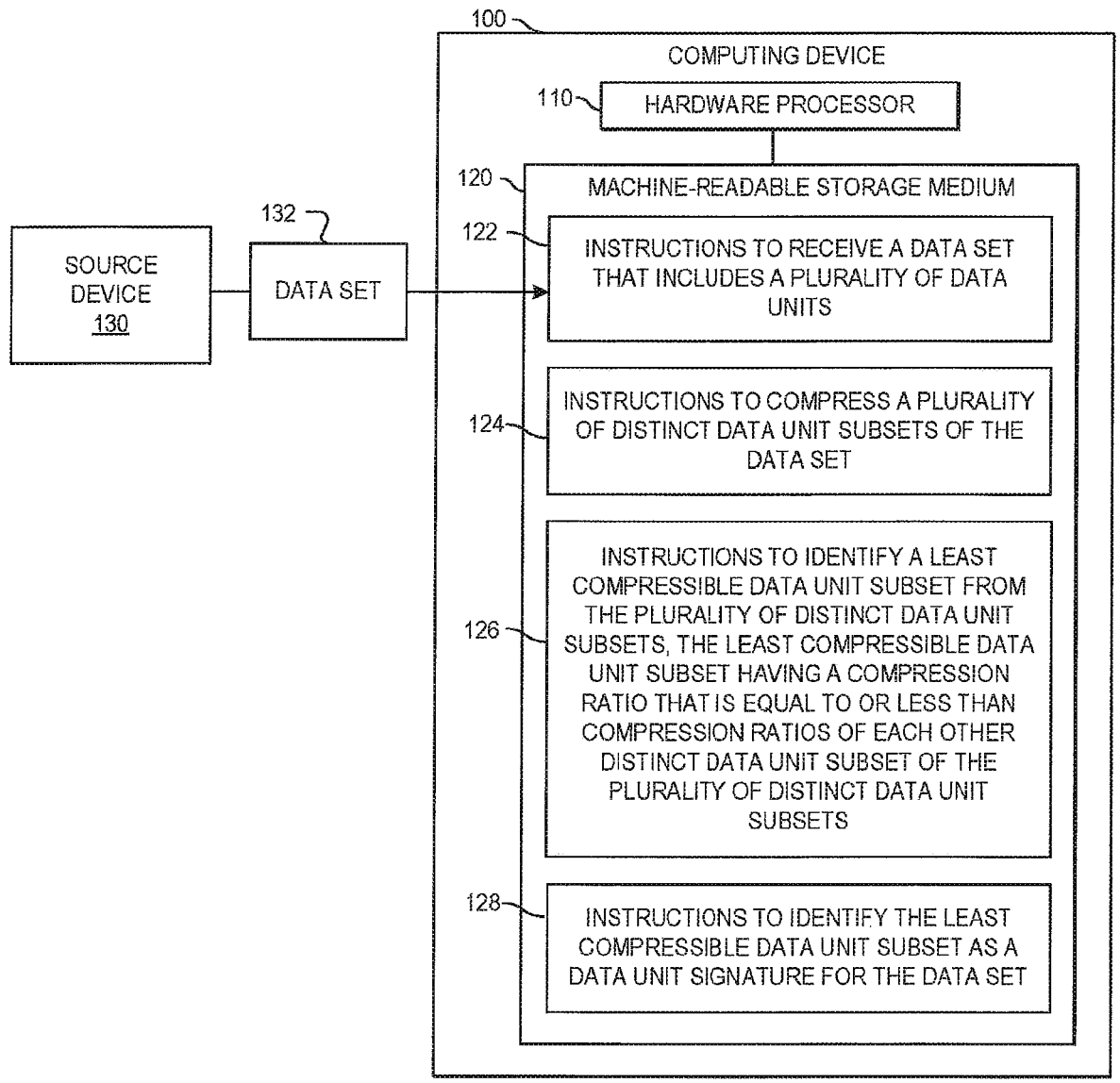
FIG. 1 is a block diagram of an example computing device for identifying a signature for a data set.

To assist with identifying and matching data sets, data signatures are often smaller than their corresponding data sets, e.g., to reduce the amount of data to be compared. By selecting a portion of a data set as a data signature, the relatively small signature may be matched against unknown data sets more quickly than comparing entire data sets. To reduce false positives, relatively complex portions of data sets may be selected as signatures, in a manner designed to reduce the likelihood that data signature would match different data sets. While false positives may be reduced by using complex portions of data sets as signatures, matches may be increased relative to other signature methods, such as hashing, because the likelihood of complex portions of data sets matching may be greater than the likelihood of file hashes matching.

In some situations, matching a signature for one data set against multiple other data sets may be desirable. For example, in the context of malicious computer files, a data signature generated via hashing the malicious file is likely to only match against the exact same malicious file. Even an insignificant change to the malicious file would likely change the hash value of the file, and anti-malware measures designed to match based on file hashes may, due to the minor change, miss malicious files. In situations where a complex portion of a malicious file is selected as the signature, changes to any other portion of the malicious file would still result in a match. For example, if 20 lines of obfuscated code in a malicious file, out of 1,000 lines, are used as a signature for the malicious file, a different file with changes to any of the other 980 lines of code wouldn't avoid detection by a device using the signature to detect malware.

One way to measure the complexity of data is by using compressibility. Relatively simple portions of data may be compressed more easily, e.g., to a smaller size, than more complex portions of data from the same data stream. For example, many compression algorithms compress data by taking advantage of repeated data or patterns, which may occur often in certain contexts, such as malicious files, creative writings, and biometric data. Another way to measure complexity of data is using entropy, where data having high entropy is more likely to be complex than data having low entropy. Malicious files often attempt to hide malicious code within more traditional code, e.g., using obfuscation. Obfuscated portions of code are one example type of data that is more likely to be complex than un-obfuscated portions of code.

In some implementations, a computing device may be used to determine complexity by iteratively compressing portions of a data set. Using the results of the compression, the least compressible portion of the data set, e.g., the most complex portion, may be selected for use as a signature for the data set. The signature may be used to attempt to match portions of other sets of data. Further details regarding the identification of signatures for data sets are described in the paragraphs that follow.

Referring now to the drawings, FIG. 1 is a block diagram of an example computing device 100 for identifying a signature for a data set. Computing device 100 may be, for example, a server computer, a personal computer, an intermediary network device, a mobile computing device, or any other electronic device suitable for processing data. In the embodiment of FIG. 1, computing device 100 includes hardware processor 110 and machine-readable storage medium 120.

Hardware processor 110 may be one or more central processing units (CPUs), semiconductor-based microprocessors, FPGAs, and/or other hardware devices suitable for retrieval and execution of instructions stored in machine-readable storage medium 120. Hardware processor 110 may fetch, decode, and execute instructions, such as 122-128, to control the process for identifying a signature for a data set. As an alternative or in addition to retrieving and executing instructions, hardware processor 110 may include one or more electronic circuits that include electronic components for performing the functionality of one or more instructions.

A machine-readable storage medium, such as 120, may be any electronic, magnetic, optical, or other physical storage device that contains or stores executable instructions. Thus, machine-readable storage medium 120 may be, for example, Random Access Memory (RAM), an Electrically Erasable Programmable Read-Only Memory (EEPROM), a storage device, an optical disc, and the like. In some implementations, storage medium 120 may be a non-transitory storage medium, where the term "non-transitory" does not encompass transitory propagating signals. As described in detail below, machine-readable storage medium 120 may be encoded with a series of executable instructions: 122-128, for identifying a signature for a data set.

As shown in FIG. 1, the computing device 100 executes instructions 122 to receive a data set 132 that includes a plurality of data units. FIG. 1 depicts the data set 132 being provided by a source device 130, which may be any device capable of communicating a data set to the computing device 100, such as a data storage device, separate computing device, or user input device. The actual data included in the data set 132 may vary depending on the context. For example, in the context of malicious code detection, the data set 132 may include a malicious stream of bytes from a file or other source of malicious code. In the context of plagiarism detection, the data set 132 may include the text of a novel, article, or essay. In the context of biometric identification, the data set 132 may be a DNA sequence, fingerprint pattern, retinal or facial mapping, or the like, which may be expressed in a variety of ways.

The computing device 100 executes instructions 124 to compress a plurality of distinct data unit subsets of the data set 132. Each data unit subset has a compression ratio of a pre-compression size to a post-compression size. Each pre-compression size, in some implementations, is the same as each other data unit subset, and the post-compression sizes and compression ratios depend upon the results of the compression. The type of compression, e.g., compression algorithm used, may vary. By way of example, in a situation where the computing device 100 is identifying a signature for a byte stream, the computing device 100 may use zlib compression to compress distinct byte subsets of the byte stream. Other compression algorithms may also be used, for example, bz2, Lempel-Ziv-Markov chain (lzma), and Lempel-Ziv-Welch (lzw). Each distinct byte subset may be different from each other being compressed, and the pre-compression size of each byte subset may, in some implementations, be the same, e.g., each distinct byte subset may be 1 KB (1,000 bytes) in size. Post-compression sizes and compression ratios of the distinct byte subsets may vary, e.g., depending upon their complexity and the compression algorithm used.

In some implementations, the computing device 100 may determine the pre-compression size of the data unit subsets based on the size of the data set 132. There are trade-offs for varying the size of the subsets. Smaller subsets may be compressed faster, but may also be less likely to be unique or distinguishing from other signatures. Subsets that include a large portion of a data set may include a large portion of data that is not complex, and the variance between subsets of the same data set may be smaller than the variance between smaller-sized subsets. The pre-compression size may be, for example, a chosen proportion—such as 1% of the size of the whole data set, or chosen from a pre-defined range of potential subset sizes. In some implementations, pre-compression sizes may be chosen in a manner designed to achieve to a certain expected false positive rate over a corpus of random data of a particular size. Pre-compression sizes may also be chosen to vary within a byte stream based on the context within the byte stream.

In some implementations, each data unit included in the data set 132 is included in at least one of the distinct data unit subsets. For example, each byte of the byte stream may be included in at least one of the distinct byte subsets being compressed. In some implementations, each distinct data unit subset is a window that includes a fixed number of contiguous data units included in the data set 132. For example, using 1 KB size windows in the example byte stream, a first window may include the first byte through the 1,000th byte, a second window may include the second byte through the 1,001st byte, and so on, e.g., until the n−1,000th window, which may include the n−1,000th byte through the nth byte.

In some implementations, each of the distinct data unit subsets are compressed using at least two compression algorithms. For example, any combination of zlib, bz2, lzma, lzw, and/or other compression algorithms may be used to compress each byte subset of the example byte stream. In this situation, the compression ratio of each subset may be based on the results from each of the compression algorithms used. For example, the compression ratio of each subset may be the average compression result, the median compression result, the smallest compression result, or the largest compression result.

The computing device 100 executes instructions 126 to identify a least compressible data unit subset from the distinct data unit subsets. The least compressible data unit subset has a compression ratio that is equal to or less than the compression ratios of each other distinct data unit subset. For example, after compressing each 1 KB size byte subset of the byte stream, the computing device 100 may identify one particular byte subset that had a compression ratio less than that of every other byte subset. Because this particular byte subset is the least compressible, it may be considered the most complex. In situations where a tie exists among least compressible byte subsets, any method may be used to identify one of them as the least compressible and, in some implementations, multiple byte subsets may be identified as the least-compressible, e.g., based on a tie and/or when multiple signatures are desired.

The computing device 100 executes instructions 128 to identify the least compressible data unit subset as a data unit signature for the data set 132. As noted above, the least compressible, e.g., most complex, data unit subset may be more likely to be unique than other portions of the data set. A data unit signature identified in the foregoing manner may have a variety of advantages and uses depending on the context. In a situation where the foregoing instructions are used to generate a malicious byte signature for a malicious computer file, the complexity of the signature may reduce false positives when using the malicious byte signature to try to identify whether an unknown file is malicious, e.g., it may be unlikely that a benign computer file includes a complex byte subset that was included in a known malicious computer file. Variants of the malicious computer file from which the malicious byte signature was identified may be more likely to be identified using the malicious byte signature than a traditional hash of the entire file. For example, the least compressible portion of a malicious file may be included in variants of the malicious file, in which case the malicious byte signature of the source malicious file may be used to identify its variants as well.

Data unit signatures may, for example, be stored in a separate storage device, provided to separate computing devices, or output to a user. Signatures may be generated for a variety of data sets to enable different types of data set detection. Signatures may be included in a database or other data structure that can be used for matching against unknown data sets, e.g., to discover matches between the unknown data sets and malicious byte signatures, literature signatures, or biometric signatures.

Figure 2A:
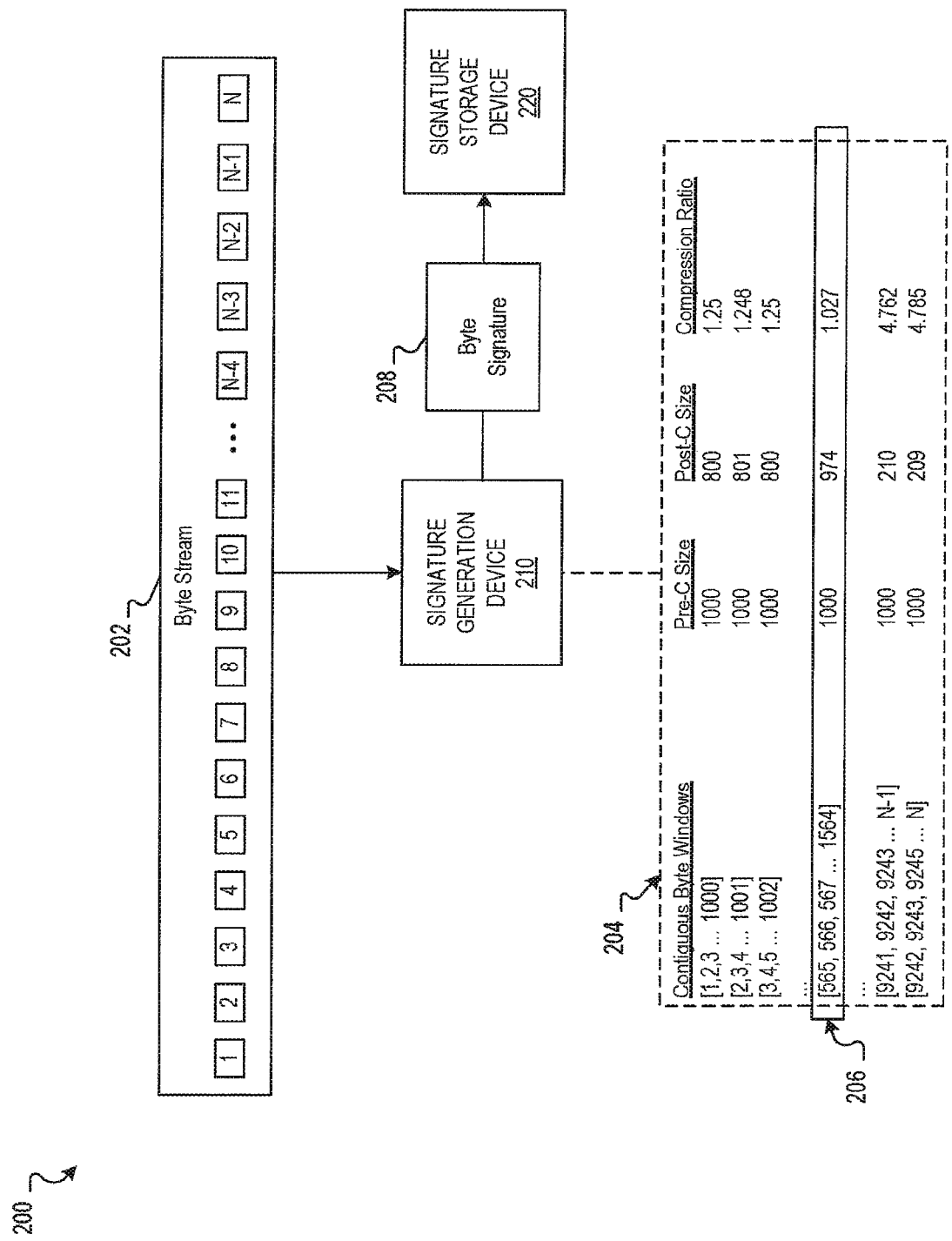
FIG. 2A is an example data flow for identifying a signature for a data set.
Figure 2B:
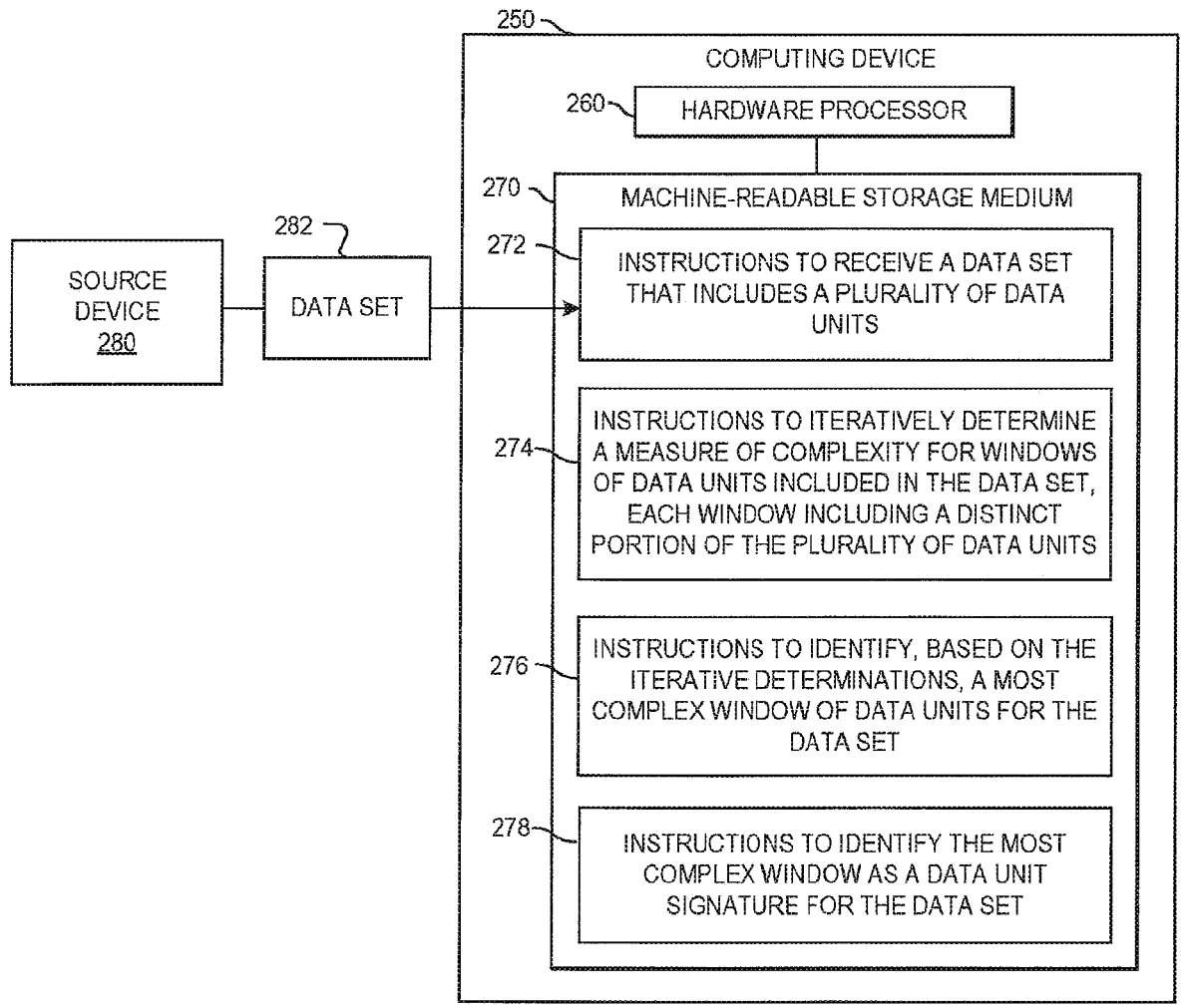
FIG. 2B is a block diagram of another example computing device for identifying a signature for a data set.

FIG. 2A is an example data flow 200 for identifying a signature for a data set. FIG. 2B is a block diagram of another example computing device 250 for identifying a signature for a data set. The computing device 250, hardware processor 260, machine-readable storage medium 270, and source device 280 may be the same as or similar to the computing device 100, hardware processor 110, machine-readable storage medium 120, and source device 130 of FIG. 1.

The data flow 200 depicts signature generation using a signature generation device 210, which may be implemented by a computing device, such as the computing device 100 described above with respect to FIG. 1 or the computing device 250 of FIG. 2B. The example data set, byte stream 202, may be provided by any input device, such as the source device 130 described above with respect to FIG. 1 or the source device 280 of FIG. 2B.

As shown in FIG. 2B, the computing device 250 executes instructions 272 to receive a data set that includes a plurality of data units. During operation in the example data flow 200, the signature generation device 210 receives the byte stream 202. The byte stream 202 is depicted as including N bytes, labeled from byte 1 to byte N. The byte stream 202 may be, for example, a malicious software script provided to the signature generation device 210 in order to identify a malicious byte signature for identifying other occurrences of the malicious software script and/or its variants.

As shown in FIG. 2B, the computing device executes instructions 274 to iteratively determine a measure of complexity for windows of data units included in the data set, each window including a distinct portion of the plurality of data units. In the example data flow 200, the signature generation device 210 iteratively determines a measure of complexity for windows of bytes included in the byte stream 202. Each window includes a distinct portion of the bytes included in the byte stream 202. The example data flow 200 depicts the iterative compression of various contiguous byte windows 204 to determine complexity. Each window has the same pre-compression size, e.g., 1,000 bytes, and a post-compression size and compression ratio that depends upon the bytes included in each window and the compression algorithm(s) used. For example, the first window—from byte 1 to 1,000—is compressed to a size of 800 bytes for a 1.25 compression ratio, the second window—from byte 2 to 1,001—is compressed to 801 bytes for a compression ratio of 1.248, and the third window—from byte 3 to 1,002—is compressed to 800 bytes for a compression ratio of 1.25. The data flow 200 also depicts a window—from byte 565 to 1,564—as being compressed to 974 bytes for a compression ratio of 1.027, and the last two windows—from byte 9,241 to N-1 and 9,242 to N—as being compressed to 210 and 209 bytes for compression ratios of 4.762 and 4.785, respectively. While the example described with respect to FIG. 2 uses compressibility of bytes as a measure of complexity, other measures of complexity, such as entropy, may also be used, alone or in combination with compression, to determine a measure of complexity for the windows of bytes.

In the example data flow 200, the windows of bytes begin from the first byte and goes to the last byte, shifting by one byte each time. In some implementations, other methods may be used to perform iterative determinations of complexity on windows of bytes. For example, windows may be shift by more than one byte at a time, or even less, e.g., one bit at a time. In the implementation depicted in the example data flow 200, complexity is determined for windows in a manner designed to determine complexity of every distinct window of the byte stream. For example, no bytes are skipped or excluded from being compressed in at least one window. In some implementations, bytes may be skipped. For example, when working in a particular context, the signature generation device 210 may skip compression of portions of byte streams previously identified as benign. In some implementations, particular data units may be excluded. For example, in some particular context, data units with specific values may be excluded from complexity calculations.

The computing device 250 of FIG. 2B executes instructions 276 to identify, based on the iterative determinations, a most complex window of data units for the data set. In the example data flow 200, the signature generation device 210 identifies, based on the iterative determinations, a most complex window 206 of bytes for the byte stream 202. This identification may be performed, for example, by determining which of the compressed windows has the smallest compression ratio. In the example data flow 200, the window 206 compressed from 1,000 bytes to 974 bytes for a compression ratio of 1.027 is identified as the least compressible window, e.g., because each other window of the byte stream 202 was compressed to a ratio greater than or equal to 1.027.

The computing device 250 of FIG. 2B executes instructions 278 to identify the most complex window as a data unit signature for the data set. In the example data flow 200, the signature generation device 210 identifies the most complex window 206 as a byte signature 208 for the byte stream 202. The signature generation device 210 provides the byte signature 208 to a signature storage device 220. The signature storage device 220 may be any device suitable of storing the byte signature 208, such as a separate network storage device, separate networking device, separate computing device, or a user output device. As noted above, signatures generated by the signature generation device 210 may be used in anti-malware devices to identify potentially malicious byte streams by matching unknown byte streams against malicious byte signatures.

Figure 3:
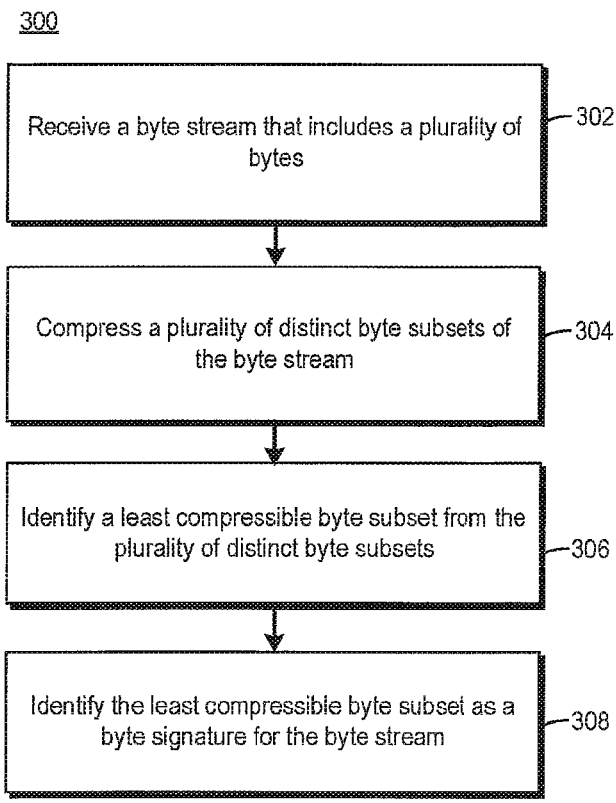
FIG. 3 is a flowchart of an example method for identifying a signature for a data set.

FIG. 3 is a flowchart of an example method 300 for identifying a signature for a data set. The method 300 may be performed by a computing device, such as a computing device described in FIG. 1. Other computing devices may also be used to execute method 300. Method 300 may be implemented in the form of executable instructions stored on a machine-readable storage medium, such as the storage medium 120, and/or in the form of electronic circuitry, such as a field-programmable gate array (FPGA) and/or an application-specific integrated circuit (ASIC). Combinations of one or more of the foregoing processors may also be used to identifying a signature for a data set.

A byte stream that includes a plurality of bytes is received (302). For example, the byte stream may be a computer file that was previously identified as a malicious computer file.

A plurality of distinct byte subsets of the byte stream are compressed (304). Each byte subset has a compression ratio of a pre-compression size to a post-compression size resulting from the compression. In some implementations, each distinct byte subset is a window that includes a fixed number of bytes included in the byte stream, and each window is different from each other window. For example, multiple windows of 500 bytes within the malicious computer file may be compressed, resulting in a compression ratio being obtained for each of the windows.

In some implementations, the pre-compression size may be determined based on a size of the byte stream. These values may be partially pre-determined. By way of example, malicious computer files smaller than 5K may have a pre-compression window size of 256 bytes, files between 5K and 500K may have a pre-compression window size of 512 bytes, files between 500K and 5 MB may have a pre-compression window size of 1 KB, and any files larger than 5 MB may have a pre-compression window size of 2 KB.

In some implementations, each of the distinct byte subsets are compressed using at least two compression algorithms. For example, the byte subsets of the malicious computer file may be compressed using both the zlib algorithm and the lzma algorithm. In this situation, the compression ratio may be based on the compression results from each of the compression algorithms. For example, if the compression ratio of one window of 500 bytes is 2.0 using zlib and 2.5 using lzma, the highest compression ratio of 2.5 may be used as the compression ratio for the window of bytes.

The least compressible byte subset is identified from the plurality of distinct byte subsets (306). The least compressible byte subset has a compression ratio that is equal to or less than compression ratios of each other distinct byte subset of the distinct byte subsets. For example, if after compressing each window of the malicious computer file, the smallest compression ratio is 1.337, then the corresponding window is identified as the least compressible window of the malicious computer file.

The least compressible byte subset is identified as a byte signature for the byte stream (308). For example, the least compressible window of bytes included in the malicious computer file may be identified as a malicious byte signature for that malicious computer file. In some implementations, particular candidate signatures may be avoided because they are common data unit subsets of high complexity, and would cause false positives. For example, security certificates and lookup tables contain highly complex byte sequences common to many files. As noted above, the malicious byte signatures may be used in a variety of anti-malware measures, e.g., for detection of potentially malicious byte streams by computer anti-virus, network intrusion prevention devices, and/or network firewalls.

The foregoing disclosure describes a number of example implementations for identifying a signature for a data set. As detailed above, examples provide a mechanism for identifying data signatures based on complex portions of data sets and potential applications of a system that is capable of identifying signatures for data sets.

We claim:

1. A non-transitory machine-readable storage medium encoded with instructions executable by a hardware processor of a computing device for identifying a signature for a data set, the machine-readable storage medium comprising instructions to cause the hardware processor to:
   receive a data set that includes a plurality of data units;
   compress a plurality of distinct data unit subsets of the data set, each data unit subset having a compression ratio of a pre-compression size to a post-compression size;
   identify a least compressible data unit subset from the plurality of distinct data unit subsets, the least compressible data unit subset having a compression ratio that is less than or equal to compression ratios of each other distinct data unit subset of the plurality of distinct data unit subsets; and
   identify the least compressible data unit subset as a data unit signature for the data set.

2. The storage medium of claim 1, wherein each distinct data unit subset is a window that includes a fixed number of contiguous data units included in the data set.

3. The storage medium of claim 1, wherein the instructions further cause the hardware processor to:
   determine the pre-compression size of each data unit subset based on a size of the data set.

4. The storage medium of claim 1, wherein each data unit included in the data set is included in at least one of the plurality of distinct data unit subsets.

5. The storage medium of claim 1, wherein each of the plurality of distinct data unit subsets are compressed using at least two compression algorithms.

6. The storage medium of claim 5, wherein the compression ratio is based on compression results from each of the at least two compression algorithms.

7. A computing device for identifying a signature for a data set, the computing device comprising:
   a hardware processor; and
   a data storage device storing instructions that, when executed by the hardware processor, cause the hardware processor to:
      receive a data set that includes a plurality of data units;
      iteratively determine a measure of complexity for windows of data units included in the data set, each window including a distinct portion of the plurality of data units;
      identify, based on the iterative determinations, a most complex window of data units for the data set; and
      identify the most complex window as a data unit signature for the data set.

8. The computing device of claim 7, wherein complexity is determined for windows in a manner designed to determine complexity of every distinct window of the data set.

9. The computing device of claim 7, wherein a size of each window is the same.

10. The computing device of claim 7, wherein:
    the measure of complexity is determined for each window by compressing the window,
    the measure of complexity is a compression ratio of a pre-compression size of the window to a post-compression size of the window, and
    the most complex window is a least compressible window.

11. A method for identifying a signature for a data set, implemented by a hardware processor, the method comprising:
    receiving a byte stream that includes a plurality of bytes;
    compressing a plurality of distinct byte subsets of the byte stream, each byte subset having a compression ratio of a pre-compression size of the byte subset to a post-compression size of the byte subset;
    identifying a least compressible byte subset from the plurality of distinct byte subsets, the least compressible byte subset having a compression ratio that is equal to or less than compression ratios of each other distinct byte subset of the plurality of distinct byte subsets; and
    identifying the least compressible byte subset as a byte signature for the byte stream.

12. The method of claim 11, wherein each distinct byte subset is a window that includes a fixed number of contiguous bytes included in the byte stream.

13. The method of claim 11, further comprising:
    determining the pre-compression size of each byte subset based on a size of the byte stream.

14. The method of claim 11, wherein each of the plurality of distinct byte subsets are compressed using at least two compression algorithms.

15. The method of claim 14, wherein the compression ratio is based on compression results from each of the at least two compression algorithms.

* * * * *